US007821665B2

(12) United States Patent

Nakazato

(10) Patent No.: US 7,821,665 B2
(45) Date of Patent: Oct. 26, 2010

(54) IMAGE FORMING DEVICE AND FIRMWARE OVERWRITING METHOD

(75) Inventor: Hiroshi Nakazato, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1201 days.

(21) Appl. No.: 11/349,729

(22) Filed: Feb. 7, 2006

(65) Prior Publication Data

US 2006/0176514 A1 Aug. 10, 2006

(30) Foreign Application Priority Data

Feb. 9, 2005 (JP) ............................. 2005-033102
Feb. 24, 2005 (JP) ............................. 2005-049481

(51) Int. Cl.
*G06K 15/00* (2006.01)
*G06F 3/12* (2006.01)

(52) U.S. Cl. .................................... 358/1.16; 358/1.15

(58) Field of Classification Search ................ 358/1.16, 358/1.17, 1.15, 1.1, 1.13, 1.9, 404, 407, 444, 358/468, 1.11, 1.14, 1.18; 399/1, 8, 9, 12, 399/24, 25, 26, 27, 28, 29, 30; 347/1, 2, 347/3, 5, 14, 23, 15, 6, 7
See application file for complete search history.

(56) References Cited

FOREIGN PATENT DOCUMENTS

| | | |
|---|---|---|
| JP | 08-161231 | 6/1996 |
| JP | 2004-191783 | 7/2004 |

*Primary Examiner*—Dov Popovici
(74) *Attorney, Agent, or Firm*—Hogan Lovells US LLP

(57) ABSTRACT

An image forming device, including: rewritable memory that stores firmware composed of a plurality of modules; and a controller that performs print processing based on the firmware stored in the memory, wherein the image forming device is structured including a detachable, consumable unit having a storage unit that stores at least one of the modules; and when the storage unit in the consumable unit set in the image forming device has a module that defines control content unique to the consumable unit (hereinafter called the 'unit unique module'), the controller overwrites the firmware in units of unit unique modules.

4 Claims, 13 Drawing Sheets

IMAGE FORMING DEVICE AND FIRMWARE OVERWRITING METHOD

CROSS-REFERENCES TO RELATED APPLICATIONS

The entire disclosure of JP-A-2005-33102, filed on Feb. 9, 2005, and JP-A-2005-49481 filed on Feb. 24, 2005, including the specification, claims, drawings and summary, is incorporated herein by reference in its entirety.

BACKGROUND

1. Technical Field

The present invention relates to an image forming device that can overwrite firmware.

2. Related Art

Conventionally, image forming devices such as printers, copy machines, and facsimiles, where, for example, two controllers are connected to each other via communication interfaces to enable communication are well known as disclosed in JP-A-1996-161231. According to the image forming device disclosed in the same, when an image signal is transmitted from an external device such as a host computer or an integrated scanner to a main controller, the main controller analyzes and performs various image processing for it, and transmits the image-processed signal (for example, a video signal) to an engine controller. Having received the signal, the engine controller, having a central processing unit (CPU) and rewritable nonvolatile memory (e.g., flash ROM or EEPROM) for storing firmware, controls an engine based on firmware stored in the nonvolatile memory and forms an image corresponding to the image signal on a sheet of copy paper, transfer paper, or normal paper, or a transparent OHP sheet.

The reason why the firmware is stored in the rewritable nonvolatile memory is to make the firmware flexible to future additional functions and version-upgrades. In other words, when an additional function or version-upgrade is needed, new firmware having the additional function is created to overwrite old firmware with.

According to a conventional method for overwriting firmware, a service person connects a predetermined device, which is a dedicated administrator device, to an image forming device and transmits new firmware from the predetermined device to a main controller in the image forming device. The main controller and an engine controller then communicate with each other via a communication interface using a communication function of existing firmware in the engine controller, thereby updating the existing firmware in nonvolatile memory in the engine controller with the new firmware.

Meanwhile, as disclosed in JP-A-2004-191783, another method for updating firmware has been proposed. According to this method, a small storage unit having firmware (a control program) stored therein is previously loaded in a toner bottle and when the toner bottle is set in an image forming device, the firmware is transferred from the small storage unit to the image forming device, thereby updating existing firmware. With this method, it is possible to update the firmware just by setting the toner bottle in the image forming device, eliminating the need for a service person, and the need for a user to have to worry about version-upgrades.

SUMMARY

If the content of the controls (e.g., calculation flows for electric potentials on photo conductors and agitation flows) performed by an engine controller can be switched according to the features of units set in an image forming device, for example, the characteristics of toners in developing units, it is possible to provide appropriate controls, hence enhance print image quality.

Put simply, the above appropriate controls can be performed by simply creating firmware that provides control-flows appropriate for all the features of the units.

However, for example, the developing units may be in different forms having different toner characteristics and unit structures according to the colors of the toners therein—cyan, magenta, yellow, and black (CMYK)—therefore, if the firmware is to be created having all the control-flows compatible with various combinations of the colors, the firmware has to be extremely large.

If so, not only the capacity of the firmware-storing memory in the image forming device increases, but the capacity of memory in a toner bottle also increases if the firmware in the device is overwritten with firmware stored in the memory in the toner bottle, like in JP-A-2004-191783.

Therefore, according to conventional techniques, techniques have not gone beyond switching control-flows, which are performed by an engine controller, according to the differences in characteristics of toners; instead, only parameters have been changed in control-flows in accordance with the characteristics.

Thereupon, a first advantage of some aspects of the invention is to provide a technique whereby control-flows performed by an engine controller are switched according to the features of consumable units, e.g., the characteristics of toners, in order to enhance print image quality, while preventing capacity expansion of memory storing firmware.

As a result of a study of a firmware overwriting methods to realize the first advantage, the inventors of the invention realized the following point—an overwrite error may occur due to various factors during overwriting of firmware. For example, there are cases where normal data may not be transmitted to an engine controller due to a communication error when transmitting/transferring new firmware. Also there are cases where a write error occurs during writing of the data in the nonvolatile memory, which also causes an overwrite error.

Moreover, when consumable units (e.g., toner bottles and cartridges) set in an image forming device are equipped with firmware-storing units, as disclosed in JP-A-2004-191783, if the consumable units are sold and leave the oversight of the manufacturers, unintended changes may be made to the firmware in the consumable units, and write errors can occur as a result of those changes.

However, with the configuration disclosed in JP-A-2004-191783, a control program is transferred from a toner bottle to the image forming device after merely checking the program version. Therefore, even if an overwrite error described above occurs, the current control program in the image forming device is not overwritten as long as the version of the control program in the toner bottle is the same as that of the current control program, and therefore, it is necessary to call service persons to have them fix the control program in the image forming device.

So a second advantage of some aspects of the invention is to provide a technique for reading firmware from a consumable unit and stably overwriting existing firmware without fail on the premise that an overwrite error can occur during overwriting of the firmware.

In order to present the first advantage of the invention, the image forming device according to the invention has: rewritable memory that stores firmware composed of a plurality of modules; and a controller that performs print processing based on the firmware stored in the memory. The image forming device is structured including a detachable consumable unit having a storage unit that stores at least one of the modules. When the storage unit in the consumable unit set in the image forming device stores a module that defines control content unique to the consumable unit (hereinafter called the 'unit unique module'), the controller overwrites the firmware in units of unit unique modules.

In the above structure, the memory in the image forming device stores, as control content unique to a consumable unit, only a unit unique module for the consumable unit currently set in the device. Accordingly, it is possible to switch among print processing control flows based on the unit unique module while reducing the capacity of the memory for storing the firmware, thereby enhancing the print quality. Moreover, the firmware can be overwritten as long as the storage unit in the consumable unit stores at least its own unit unique module, therefore, the capacity of the storage unit can also be reduced.

It is preferable that, based on the features of the consumable unit, the controller judge whether to overwrite the firmware in units of unit unique modules using the unit unique module stored in the storage unit in the consumable unit.

It is also preferable that, based on the version of the unit unique module, the controller judge whether to overwrite the firmware in units of unit unique modules using the unit unique module stored in the storage unit in the consumable unit.

It is also preferable that, if the storage unit in a consumable unit A set in the image forming device stores a module that defines control content common to a plurality of consumable units (hereinafter called the 'unit common module'), the controller overwrite a unit common module in the firmware with that unit common module.

It is also preferable that, based on the versions of the unit common modules, the controller judge whether to overwrite the unit common module in the firmware with that unit common module stored in the storage unit in the consumable unit.

According to the invention, the detachable consumable unit is provided in an image forming device that has: rewritable memory that stores firmware composed of a plurality of modules; and a controller that performs print processing based on the firmware stored in the memory. The detachable consumable unit includes: a storage unit that stores a module defining control content unique to the consumable unit, the module being referred to when the controller overwrites the firmware in units of unit unique modules.

According to the invention, the method for overwriting firmware for an image forming device stored in rewritable memory, the firmware being composed of a plurality of modules, includes: if a storage unit in a consumable unit set in the image forming device has a module that defines control content unique to the consumable unit (unit unique module), judging whether to overwrite the firmware using the unit unique module based on the features of the consumable unit; and overwriting the firmware in units of unit unique modules using the unit unique module if it is judged that overwriting is to be performed.

In order to present the second advantage of the invention, the image forming device includes: rewritable memory that stores firmware composed of a first portion which is not to be overwritten (hereinafter called the 'first firmware portion') and a second portion which is to be overwritten (hereinafter called the 'second firmware portion'); and a controller that performs print processing based on the second firmware portion stored in the memory. The image forming device is structured including a detachable consumable unit having a storage unit that stores a second firmware portion. When it is judged that the second firmware portion stored in the memory is not normal, the controller reads the second firmware portion from the storage unit in the consumable unit and overwrites the second firmware portion in the memory with that second firmware portion, based on the first firmware portion stored in the memory.

With the above structure, normality of the second firmware portion stored in the memory in the image forming device is checked, and if it is judged that the second firmware portion is not normal, whether or not to read the second firmware portion from the storage unit in the consumable unit and to overwrite the second firmware portion in the memory of the image forming device with that second firmware portion is determined. Accordingly, even if an overwrite error occurs in the second firmware portion in the memory when performing the firmware overwrite processing, overwriting of the firmware can be conducted stably without fail by reading the second firmware portion from the storage unit in the consumable unit.

It is preferable that the controller position the consumable unit at a specified position by controlling a mechanical part for moving the consumable unit in order to read, wirelessly, the second firmware portion from the storage unit in the consumable unit.

It is also preferable that the image forming device be structured including a plurality of detachable, consumable units; and the controller select, from among the consumable units set in the image forming device, the consumable unit having the storage unit storing the latest version of the second firmware portion and reads the second firmware portion from the storage unit in the selected consumable unit.

It is also preferable that the image forming device be structured including a plurality of detachable consumable units; and when it is judged that the second firmware portion in the memory is not normal, the controller select, from among the consumable units set in the image forming device, the consumable unit selected in the previous overwriting and reads the second firmware portion from the storage unit in that selected consumable unit.

According to the invention, the detachable consumable unit is provided in an image forming device having: rewritable memory that stores firmware composed of a first portion that is not to be overwritten (first firmware portion) and a second portion that is to be overwritten (second firmware portion); and a controller that performs print processing based on the second firmware stored in the memory. The consumable unit has a storage unit that stores a second firmware potion. When the controller judges that the second firmware portion stored in the memory is not normal, the second firmware portion stored in the storage unit is read and used to overwrite the second firmware portion stored in the memory, based on the first firmware portion stored in the memory.

According to the invention, the method for overwriting firmware for an image forming device stored in rewritable memory, the firmware being composed of a first portion that is not to be overwritten and used for performing firmware overwrite processing (first firmware portion), and a second portion that is to be overwritten and used for performing print processing (second firmware portion), includes, as steps performed based on the first firmware portion stored in the memory: judging whether at least the second firmware portion stored in the memory is normal; when it is judged that the second firmware portion stored in the memory is not normal, reading the second firmware portion from a storage unit in a detachable consumable unit provided in the image forming device; and overwriting the second firmware portion stored in the memory with the second firmware portion read from that storage unit.

The firmware overwriting method according to the invention can be implemented by a computer and a computer program for the method (first firmware portion with regard to the second advantage) can be installed or loaded in the memory in the image forming device through various media, such as CD-ROMs, magnetic disks, semiconductor memory, and communication networks.

Note that each of the characteristic structures of the invention above may be freely combined based on the technical idea of the invention.

DESCRIPTION OF EXEMPLARY EMBODIMENTS

Embodiment 1

Figure 1:
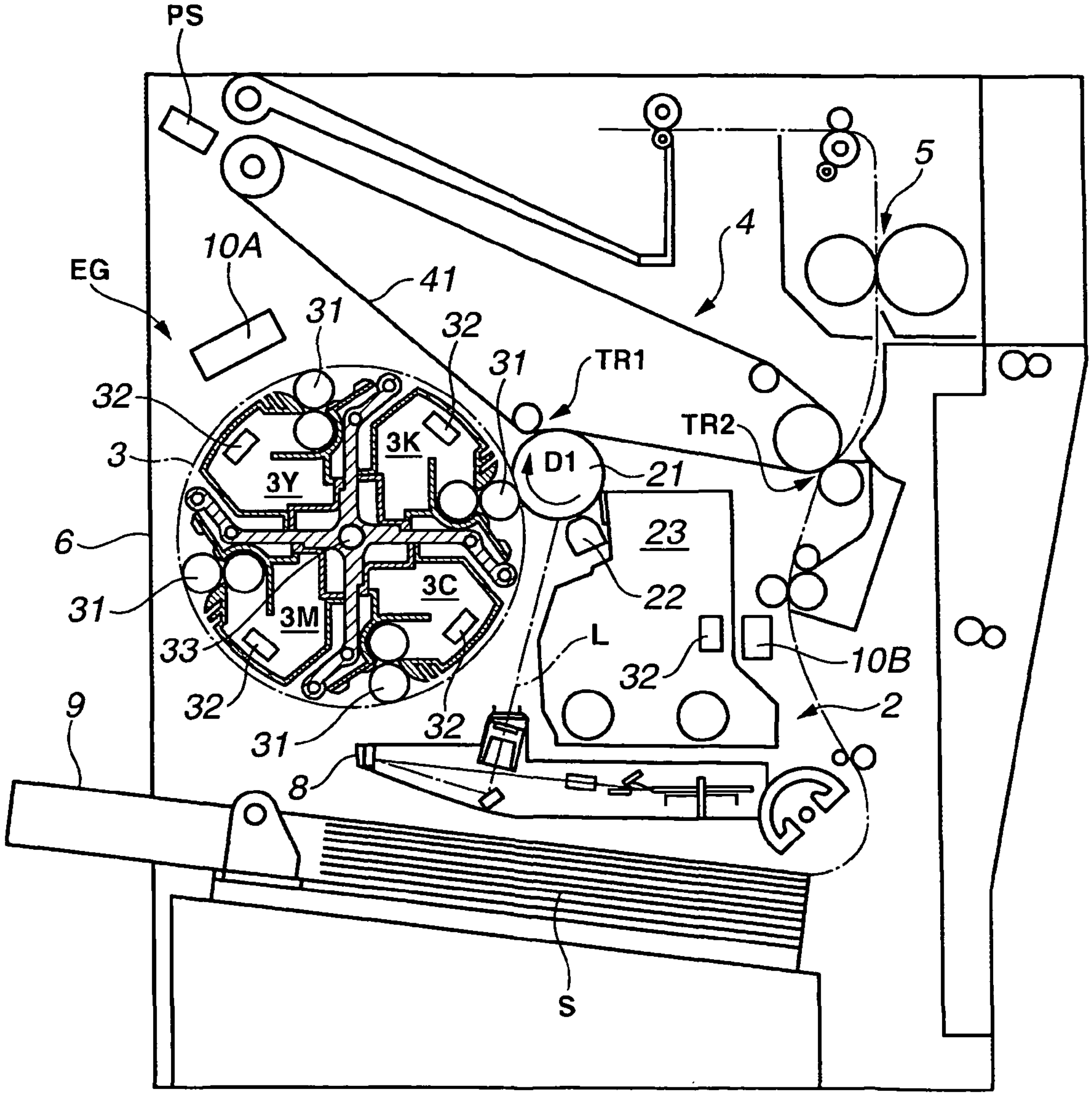
FIG. 1 shows an image forming device according to Embodiment 1 of the invention.
Figure 2A:
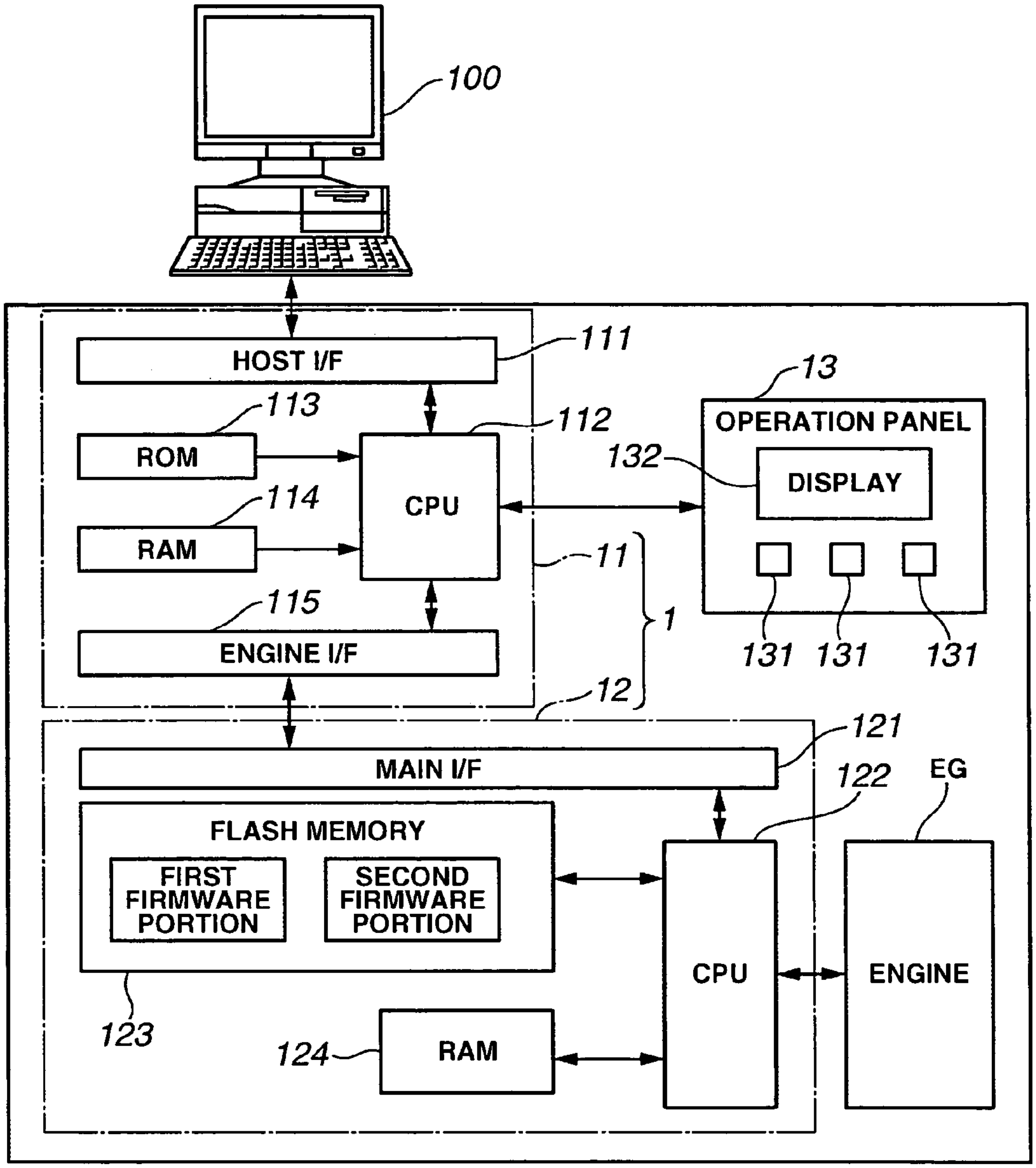
FIG. 2A is a block diagram showing the structure of the image forming device in FIG. 1.
Figure 2B:
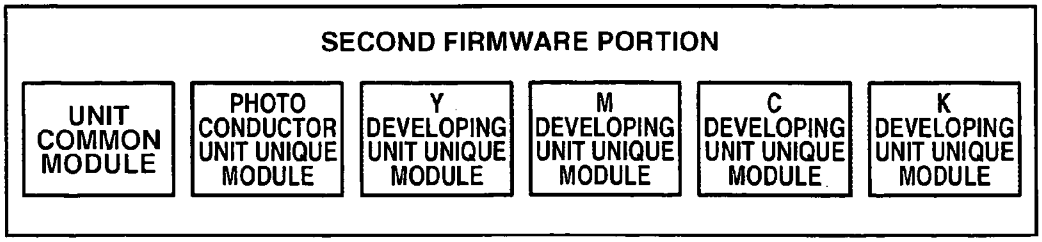
FIG. 2B is a block diagram showing the structure of the second firmware portion in FIG. 2A.

FIG. 1 shows Embodiment 1 of an image forming device according to the invention. FIG. 2A is a block diagram showing the structure of the image forming device in FIG. 1. FIG. 2B is a block diagram showing the structure of the second firmware portion in FIG. 2A. In the image forming device, when an image signal is sent from an external device, such as a host computer 100, to a main controller 11 in a control unit 1, the main controller 11 analyzes the image signal, performs various image processing for it, and sends the image-processed signal to an engine controller 12. The engine controller 12 then controls all the parts in an engine EG based on firmware stored in flash memory 123 and forms an image corresponding to the image signal on a sheet S such as a copy paper, transfer paper, normal paper, or a transparent OHP sheet. The image forming device has a function that forms full-color images with combinations of four colors of toner—yellow (Y), magenta (M), cyan (C), and black (K)—as well as a function that forms monochrome images only with black (K) toner.

The engine EG includes: a photo conductor unit 2; a rotary development section 3 (including a development unit for yellow (Y development unit) 3Y, a development unit for magenta (M development unit) 3M, a development unit for cyan (C development unit) 3C, a development unit for black (K development unit) 3K, and others); an intermediate transfer unit 4; a fixing unit 5; an exposure unit 8; firmware read units 10A and 10B; and others. Among these components, units 2, 3Y, 3M, 3C, 3K, 4, 5, and 8 are removable from the image forming device 6. With those respective units loaded in the device 6, a photo conductor 21 in the photo conductor unit 2 rotates in the direction indicated by the arrow D1 in FIG. 1, thereby performing print processing. Note that the Y development unit 3Y, M development unit 3M, C development unit 3C, K development unit 3K can be regarded as consumable products because they include consumable toners; the photo conductor unit 2 can also be considered as a consumable product because it deteriorates with age.

The photo conductor unit 2 has the photo conductor 21, a charging section 22, and a cleaning section 23 loaded therein, and those elements are integrally removable from the image forming device 6. Charging bias is applied from a charging bias generating unit (not shown in the drawing) to the charging section 22 so that the charging section 22 can charge the periphery of the photo conductor 21 uniformly. The cleaning section 23 is located upstream from the charging section 22 in the rotation direction D1 of the photo conductor 21 and is able to clean the surface of the photo conductor 21 by scraping toners that remain on the periphery of the photo conductor 21 after primary transfer.

The exposure unit 8 irradiates an optical beam L onto the periphery of the photo conductor 21 that has been charged by the charging section 22. The exposure unit 8, being electrically connected to a laser driver (not shown in the drawing) provided in the engine controller 12, is controlled according to a drive signal from the laser driver, and it exposes the optical beam L onto the photo conductor 21 to form an electrostatic latent image corresponding to the image signal on the photo conductor 21.

The electrostatic latent image formed as above is toner-developed by the rotary development section 3. The rotary development section 3 is structured having: the respective developing units (Y developing unit 3Y, M developing unit 3M, C developing unit 3C, K developing unit 3K) rotatably located around the axis; and a mechanical part 33 for rotating the respective developing units and positioning them in predetermined positions (for example, a development position for the photo conductor 21 and a communication position for communication with the firmware read unit 10A).

When one of the developing units is positioned at the development position by the mechanical part 33 in the rotary development section 3, the toner stored in the unit housing of that developing unit is carried by a developing roller 31. Then, when a predetermined development bias is applied to the developing roller 31, the toner carried/conveyed by the developing roller 31 adheres to the photo conductor 21, thereby developing the electrostatic latent image. Consequently, a toner image of the selected color is formed on the surface of the photo conductor 21.

FIG. 1 shows the situation where the K developing unit 3K is positioned at the development position and a developing roller 31 provided in the K developing unit 3K is located opposite the photo conductor 21.

The toner image developed as above by the development section 3 is primary-transferred, in a primary transfer area TR1, onto an intermediate transfer belt 41 of the intermediate transfer unit 4. Specifically speaking, the intermediate transfer unit 4 includes the intermediate transfer belt 41 that runs over a plurality of rollers; and a driver (not shown in the drawing) that rotates and drives the intermediate transfer belt 41. When transferring a color image onto a sheet S, toner images of the respective colors formed on the photo conductor 21 are superimposed on the intermediate transfer belt 41 to form a color image. Meanwhile, when transferring a single color image onto a sheet S, only a black toner image formed on the photo conductor 21 is transferred onto the intermediate transfer belt 41 to form a single color image.

In the image forming device, a patch sensor PS is located opposite the roller the intermediate transfer belt 41 runs on.

The image thus formed on the intermediate transfer belt 41 is secondary-transferred, in a predetermined secondary transfer area TR2, onto the sheet S that has been taken out of a cassette 9. Then, the toner image-transferred sheet S is introduced into the fixing unit 5 equipped with a heater (not shown in the drawing) to be heated and have pressure applied so that the toner is fixed on the sheet S. The sheet S having the image formed on it as described above is conveyed to an outlet tray provided on the upper surface of the image forming device 6.

In Embodiment 1, a developing unit having a small IC chip 32 attached by a screw or an adhesive may be used as each of the developing units. Likewise, a photo conductor having an IC chip 32 attached can be used as the photo conductor unit 2.

An IC chip 32 stores a part of firmware in its internal semiconductor circuit. In Embodiment 1, the firmware consists of a first part (first firmware portion) which is not to be overwritten; and a second part (second firmware portion) which is to be overwritten, and the second firmware portion includes a plurality of modules, e.g., a module defining control content common to the consumable units (unit common module) and modules respectively defining the control content unique to the respective consumable units (unit unique modules) (see FIG. 2B). Among those modules composing the second firmware portion, an IC chip 32 stores a unit unique module unique to the consumable unit it is attached to.

The 'control content unique to the consumable unit' specifically means that control content is determined for each consumable unit according to the features of the consumable unit (e.g., structural features of the consumable unit and characteristics of a consumable therein; hereinafter called the 'unit features'). For example, if a consumable unit is a developing unit, formulas to calculate optimal electric potential bias and optical transfer bias to apply to the developing unit and the photo conductor unit 2 (using variables such as temperature, humidity, electric potential at a laser-irradiated portion $V_L$, electric potential at a non-irradiated portion $V_0$); optimal laser power; a formula for estimating $V_L$; an agitation algorithm for the developing unit; the content of a control table; the content for modification of the above formulas and the like due to aging; and others depend on the properties (e.g., adhesion property) of the toner in the developing unit. Accordingly, by deciding the control content in accordance with the properties of the toner, it is possible to perform optimal control for the developing unit and enhance the print image quality.

A unit unique module stored in an IC chip 32 is read and sent to the engine controller 12 by the firmware read unit 10A or 10B upon execution of unit-based firmware overwrite processing, which will be described later. That type of IC chip 32 and firmware read units 10A and 10B can be structured using a conventional data carrier technique.

The electric structure of the image forming device in FIG. 1 will be explained with reference to FIGS. 2A and 2B. The main controller 11 has a host interface 111, a CPU 112, a ROM 113, a RAM 114, and an engine interface 115. The main controller 11 is configured to communicate with the host computer 100 via the host interface 111 and receives image signals and predetermined programs sent from the host computer 100. Received image signals and others are temporarily stored in the RAM 114.

The CPU 112 is electrically connected to an operation panel 13 mounted on the image forming device 6 via an input/output port (not shown in the drawing). The operation panel 13 has: a plurality of switches 131 whereby a user gives various commands to the CPU 112; and a display 132 to show messages and print statuses to the user. The operation panel 13 serves as a man-machine interface.

The ROM 113 has a program for the main controller 11 previously stored therein and the CPU 112 and a logic circuit (not shown in the drawing) operate based on the program, performing various image processing for received image signals. For example, the CPU 112 and the logic circuit convert RBG data indicating tone levels of RGB components of all pixels in an image corresponding to an image signal, to CMYK data indicating the tone levels for the corresponding CMYK components. Moreover, they also execute, after performing tone correction for the CMYK data for each pixel, half-toning processing such as error diffusion, dithering, screening and the like and create, for example, 8 bit half-tone CMYK data for each pixel and color. Then, using the halftone CMYK data, they create a video signal to modulate the pulse widths of the exposure laser pulses for images of each color; and output it to the engine controller 12 via the engine interface 115.

The engine controller 12 has a main interface 121, a CPU 122, flash memory 123, and a RAM 124 as shown in FIG. 2A. The main interface 121 is for communication with the main controller 11 and the engine controller 12 receives commands and data from the main controller 11 via the main interface 121.

The flash memory 123 is rewritable memory and stores firmware (first firmware portion and second firmware portion). However, it is preferable to have the first firmware portion, which is not to be overwritten, stored in a write-protected area in the flash memory 123.

The CPU 122 runs the second firmware portion stored in the flash memory 123 to control the respective parts in the engine EG, thereby executing print processing for forming an image corresponding to an image signal on a sheet S such as a copy paper, transfer paper, normal paper or a transparent OHP sheet. In other words, the second firmware portion includes programs for implementing functions required for normal print processing.

The CPU 122 also runs the first firmware portion stored in the flash memory 123 to execute firmware overwrite processing.

In Embodiment 1, firmware overwrite processing is performed by the CPU 122 selecting either conventional firmware overwrite processing where the CPU 122 communicates with the main controller 11 via the main interface 121 and overwrites the second firmware portion stored in the flash memory 123 based on the second firmware portion sent from the main controller 11; or unit-based firmware overwrite processing, where the CPU 122 controls the firmware read units 10A and 10B to have them read unit unique modules from the IC chips 32 in the respective developing units 3Y, 3M, 3C and 3K and the photo conductor unit 2 and stores them (overwrites existing unit unique modules with them) in the flash memory 123.

In other words, the first firmware portion includes programs for implementing the functions necessary for both the above firmware overwrite processing, e.g., a function for communication with the main controller 11, a function for controlling the mechanical part 33 in the rotary development section 3, a function for controlling the firmware read units 10A and 10B to have them read unit unique modules, a function for storing (overwriting) unit unique modules in the flash memory 123, and others.

Example 1 of Embodiment 1

A first example of the unit base firmware overwrite processing will be explained in detail with reference to the flowcharts shown in FIGS. 3 and 4. Note that the steps in the flowcharts (including partial steps having no reference numerals attached) may be arbitrarily performed in a different order or some steps may be performed in parallel, as long as there is no inconsistency in the processing content (this can also be said for other examples).

When the image forming device is powered on, the CPU 122 runs the first firmware portion stored in the flash memory 123 (S100 to S110).

Concretely speaking, the CPU 122 first judges whether the photo conductor unit 2 has been replaced in the image forming device 6 during the time between its power-off and power-on (S100). For example, it may be configured in such a manner that a flag is electrically set upon removal/installation of the photo conductor unit 2 so that the CPU 122 can make judgment based on that flag.

If the CPU 122 judges that the photo conductor unit 2 has not been replaced, it proceeds to step S104.

If the CPU 122 judges that the photo conductor unit 2 has been replaced, it further checks whether the replacement photo conductor unit 2 has an IC chip 32 (S101), and if it does not have an IC chip 32, the CPU 122 proceeds to step S104.

For example, the CPU 122 judges that the replacement photo conductor unit 2 does not have an IC chip 32 (including where the IC chip 32 is not functioning normally) when it controls the firmware read unit 10B, located in a position where it can communicate with the IC chip 32 in the photo conductor unit 2, to have it emit an electromagnetic wave (charge wave) to the IC chip 32 and the CPU 122 does not receive any response signal from the IC chip 32 after a predetermined number of retries.

If the CPU 122 judges that the replacement photo conductor unit 2 has an IC chip 32, it controls the firmware read unit 10B to have it read the unit feature and the version of the unit unique module stored in the IC chip 32. The CPU 122 also reads the unit feature and the version of the unit unique module that has been stored in the flash memory 123 for a consumable unit of the same kind as the consumable unit having that IC chip 32 (a photo conductor unit in this case). The CPU 122 then compares them (S102).

If their unit features match and the version of the unit unique module in the flash memory 123 is newer than or the same as that of the unit unique module in the IC chip 32, the CPU 122 proceeds to step S104.

Meanwhile, if their unit features do not match or their unit features match but the version of the unit unique module in the IC chip 32 is newer than that of the unit unique module in the flash memory 123, the CPU 122 controls the firmware read unit 10B to have it read the unit unique module in the IC chip 32 and overwrites the unit unique module for the photo conductor unit in the flash memory 123 with that module (S103).

Concretely speaking, the CPU 122 overwrites the unit unique module for the photo conductor unit by first deleting the unit unique module that has already been stored in the flash memory 123; reading the unit unique module from the IC chip 32 in units of predetermined size (for example, 128 bytes); storing it in the RAM 124; and writing it in the flash memory 123.

The CPU 122 then judges whether any developing unit has been replaced in the image forming device 6 during the time between the power-off and power-on of the device (S104). This judgment can be made in the same manner as in S100.

If the CPU 122 judges that no developing unit has been replaced, it proceeds to S10.

If the CPU 122 judges that one or more developing units have been replaced, it selects one of replacement developing units and positions it at the communication position by controlling the mechanical part 33 in the rotary development section 3 (S105). Note that the communication position refers to a position where the firmware read unit 10A can wirelessly read a unit unique module from an IC chip 32 in a developing unit located there.

The CPU 122 then judges whether the developing unit positioned at the communication position has an IC chip 32 (S106) and if it does not have an IC chip 32, it proceeds to step S109. The judgment about the IC chip 32 can be made in the same manner as in step S101.

If the CPU 122 judges that the developing unit at the communication position has an IC chip 32, it controls the firmware read unit 10A to have it read the unit feature and the version of the unit unique module stored in that IC chip 32. The CPU 122 also reads the unit feature and the version of the unit unique module that has been stored in the flash memory 123 for a consumable unit of the same kind as the consumable unit having that IC chip 32 (a developing unit for the same toner color in this case). The CPU 122 then compares them (S107).

If their unit features match and the version of the unit unique module stored in the flash memory 123 is newer than or the same as that of the unit unique module in the IC chip 32 in the developing unit, the CPU 122 proceeds to step S109.

Whereas, if their unit features do not match or their unit features match but the version of the unit unique module stored in the IC chip 32 is newer than that of the unit unique module in the flash memory 123, the CPU 122 controls the firmware read unit 10A to have it read the unit unique module from the IC chip 32 and overwrites the unit unique module that has been stored in the flash memory 123 for a developing unit of the same toner color as that developing unit (S108). Overwriting of the module can be performed in the same manner as in step S103.

The CPU 122 then judges whether there are any other developing units that have been replaced (S109), and if the judgment is positive, the CPU 122 returns to step S105 to select the replacement developing units. If the judgment is negative, the CPU 122 proceeds to step S110.

The CPU 122 then starts the second firmware portion (including the photo conductor unit unique module and developing unit unique modules) stored in the flash memory 123 (S10). Accordingly, processing based on the first firmware portion stored in the flash memory 123 is finished, moving to a state where normal print processing can be performed.

According to the above-described processing, firmware (second firmware portion) is overwritten in units of unit unique modules when consumable units set in the image forming device have corresponding unit unique modules stored in their IC chips; accordingly, the flash memory 123 stores, as control contents unique to the respective consumable units, only the unit unique modules for the consumable units currently set in the image forming device. Consequently, it becomes possible to switch the control flows of the engine controller according to, for example, the toner properties based on the unit unique modules, while reducing the capacity of the firmware-storing flash memory 123, thereby enhancing the print quality. Moreover, overwriting can be performed as long as an IC chip 32 stores a unit unique module for the consumable unit it is attached to, therefore, the capacity of the IC chip 32 can also be reduced.

Example 2 of Embodiment 1

Figure 5:
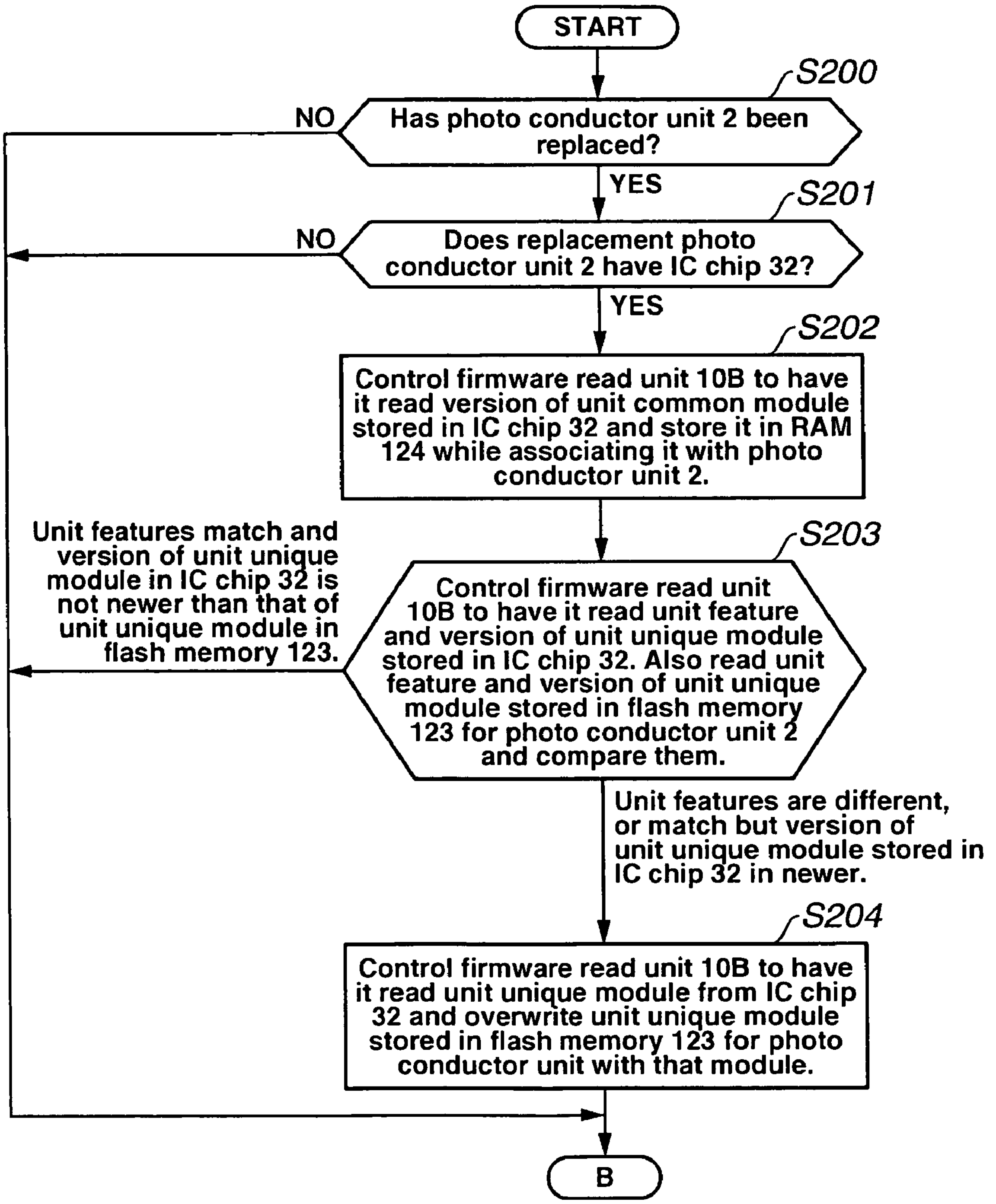
FIG. 5 is a flowchart showing unit-based firmware overwrite processing in Example 2 of Embodiment 1.
Figure 6:
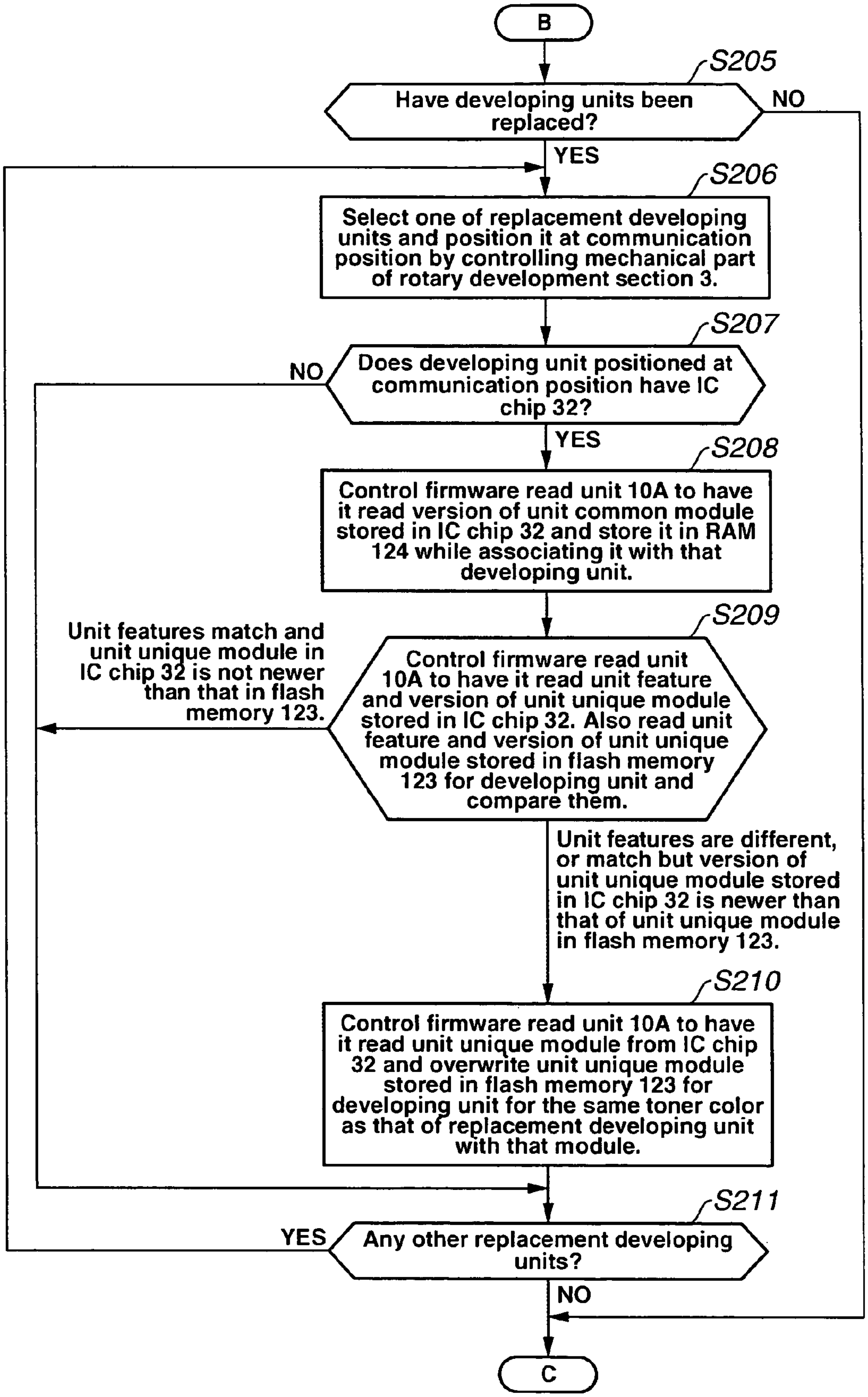
FIG. 6 is a flowchart also showing the unit-based firmware overwrite processing in Example 2 of Embodiment 1.
Figure 7:
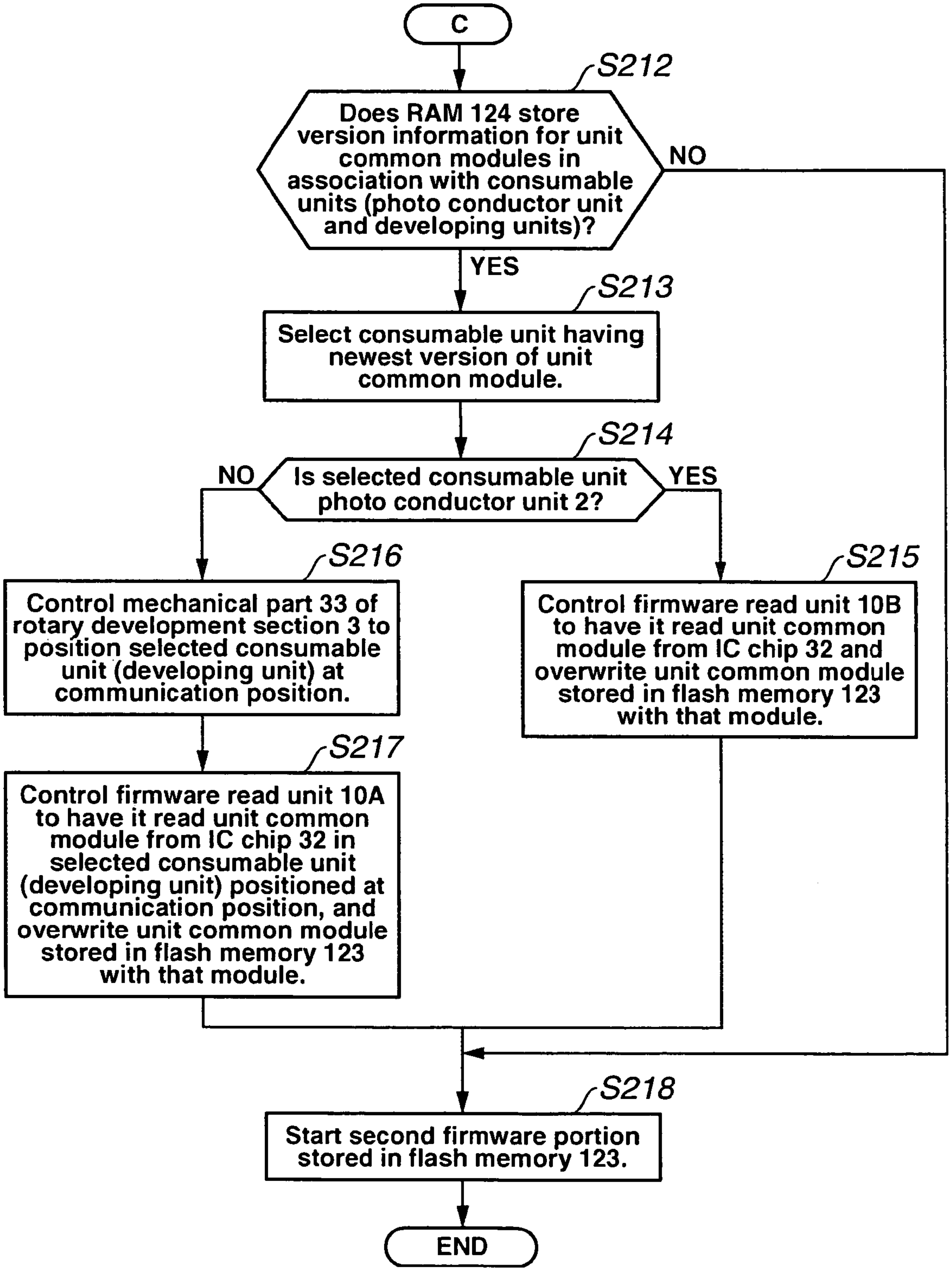
FIG. 7 is a flowchart also showing the unit-based firmware overwrite processing in Example 2 of Embodiment 1.

A second example of the unit-based firmware overwrite processing will be explained in detail with reference to FIGS. 5 to 7.

In this example, it is assumed that an IC chip 32 stores, in addition to a unit unique module, a unit common module, both constituting the second firmware portion.

When the image forming device is powered on, the CPU 122 runs the first firmware portion stored in the flash memory 123 (S200 to S218).

Concretely speaking, the CPU 122 first judges whether the photo conductor unit 2 has been replaced during the time between the power-off and power-on of the image forming device (S200).

If the CPU 122 judges that the photo conductor unit 2 has not been replaced, it proceeds to step S205.

If the CPU 122 judges that the photo conductor unit 2 has been replaced, it further judges whether the replacement photo conductor unit 2 has an IC chip 32 (S201) and if the photo conductor unit 2 does not have an IC chip 32, the CPU 122 proceeds to step S205.

Whereas, if the CPU 122 judges that the photo conductor unit 2 has an IC chip 32, it controls the firmware read unit 10B to have it read the version of the unit common module stored in the IC chip 32 and stores it in the RAM 124 while associating it with the photo conductor unit 2 (S202).

The CPU 122 continues to control the firmware read unit 10B to have it read the unit feature and the version of the unit unique module stored in the IC chip 32. The CPU 122 also reads the unit feature and the version of the unit unique module that has been stored in the flash memory 123 for a consumable unit of the same kind as that consumable unit having the IC chip 32 (a photo conductor unit in this case). The CPU 122 then compares them (S203).

If their unit features match and the version of the photo conductor unit unique module stored in the flash memory 123 is newer than or the same as that of the unit unique module in the IC chip 32, the CPU 122 proceeds to step S205.

Meanwhile, if their unit features do not match, or they match but the version of the unit unique module stored in the IC chip 32 is newer than that of the unit unique module in the flash memory 123, the CPU 122 controls the firmware read unit 10B to have it read the unit unique module from the IC chip 32 and overwrites the unit unique module stored in the flash memory 123 for the photo conductor unit with that module (S204).

Subsequently, the CPU 122 judges whether any developing unit has been replaced during the time between the power-off and power-on of the image forming device 6 (S205).

If the CPU 122 judges that no developing unit has been replaced, it proceeds to step S212.

Whereas, if the CPU 122 judges that one or more developing units have been replaced, it selects one of the replacement developing units and positions it at the communication position by controlling the mechanical part 33 of the rotary development section 3 (S206).

The CPU 122 further judges whether the developing unit positioned at the communication position has an IC chip 32 (S207), and if it does not have an IC chip 32, the CPU 122 proceeds to step S211.

If the CPU 122 judges that the developing unit at the communication position has an IC chip 32, it controls the firmware read unit 10A to have it read the version of the unit common module stored in the IC chip 32 and stores it in the RAM 124 while associating it with that developing unit (S208).

The CPU 122 then has the firmware read unit 10A read the unit feature and the version of the unit unique module stored in the IC chip 32. It also reads the unit feature and the version of the unit unique module that has been stored in the flash memory 123 for a consumable unit of the same kind as the consumable unit having that IC chip 32 (a developing unit for the same toner color in this case). Then it compares them (S209).

If their unit features match and the unit unique module stored in the flash memory 123 is newer than or the same as that of the unit unique module in the IC chip 32, the CPU 122 proceeds to step S211.

Whereas, if their unit features do not match, or they match but the version of the unit unique module stored in the IC chip 32 is newer than that of the unit unique module in the flash memory 123, the CPU 122 controls the firmware read unit 10A to have it read the unit unique module from the IC chip 32 and overwrites the unit unique module stored in the flash memory 123 for a developing unit for the same toner color as that of the replacement developing unit (S210).

The CPU 122 then judges whether there are any other developing units that have been replaced (S211), and if the judgment is positive, the CPU 122 returns to step S206 to select the replacement developing units, but if the judgment is negative, the CPU 122 proceeds to step S212.

The CPU 122 then refers to the RAM 124 and judges whether the RAM 124 stores the version information for the unit common modules in association with the respective consumable units (photo conductor unit and developing units) (S212), and if the judgment is negative, the CPU 122 proceeds to step S218.

If the CPU 122 judges that the version information is stored for the respective consumable units (photo conductor unit and developing units), it selects the consumable unit whose unit common module is the newest among them (S213).

The CPU 122 then judges whether the selected consumable unit is the photo conductor unit 2 (S214) and if the judgment is positive, it controls the firmware read unit 10B to have it read the unit common module from the IC chip 32 in the photo conductor unit 2 and overwrites the unit common module that has been stored in the flash memory 123 with that module (S215).

Whereas, if the selected consumable unit is a developing unit, the CPU 122 controls the mechanical part 33 of the rotary development section 3 to position the selected consumable unit (developing unit) at the communication position (S216).

The CPU 122 then controls the firmware read unit 10A to have it read the unit common module from the IC chip 32 in the selected consumable unit (developing unit) positioned at the communication position; and overwrites the unit common module that has been stored in the flash memory 123 with that module (S217).

The CPU 122 then starts the second firmware portion (including the photo conductor unit unique module and the developing unit unique modules) stored in the flash memory 123 (S218). Accordingly, the processing based on the first firmware portion stored in the flash memory 123 is finished, moving to a state where normal print processing can be performed.

According to the above-described processing, in addition to the effect in Example 1, if consumable units have unit common modules stored in their IC chips 32, the newest unit common module version is read from among the IC chips 32 and the unit common module in the firmware (second firmware portion) in the flash memory 123 is overwritten with that unit common module.

Modified Example According to Embodiment 1

The invention is not limited to Embodiment 1 and can be modified in various forms. For example, in Embodiment 1, both the photo conductor unit 2 and the developing units have IC chips 32 however, alternatively, only the photo conductor unit 2 or only the developing units may have IC chip(s) 32. It is also possible to mount IC chips 32 in removable consumable units other than the developing units and the photo conductor unit 2 (e.g., intermediate transfer unit 4, fixing unit 5, and exposure unit 8; these units also can be considered as consumable units because their functions deteriorate with age) so that unit unique modules are read from them.

Moreover, in Embodiment 1, the invention is applied to the 4-cycle type image forming device that develops a toner image for each color but the invention is not limited to the embodiment. For example, it can be applied to a tandem type image forming device that develops toner images of all colors at a time; however, in this case, it is necessary to provide firmware read units for developing units of each color or to provide a mechanical part for driving a firmware read unit to a position where it can communicate with the respective developing units. Furthermore, the invention may also be applied to image forming devices other than a laser printer, i.e., it may be applied to various types of image forming devices including an inkjet type image forming device, copy machine, facsimile, and an image forming device so-called a dumb printer or a host-based printer having limited firmware functions.

Embodiment 2

Figure 8:
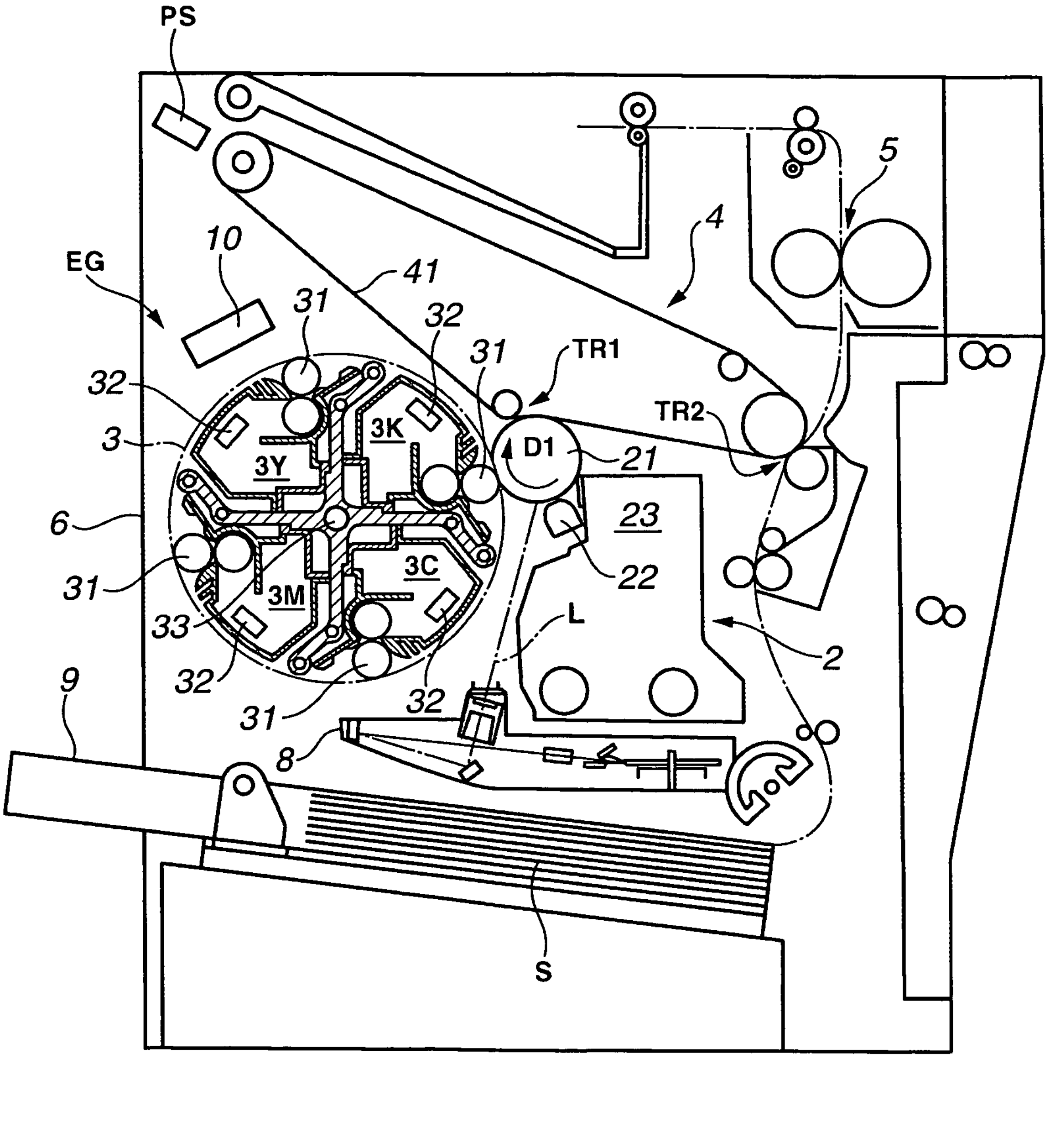
FIG. 8 shows an image forming device according to Embodiment 2 of the invention.

FIG. 8 shows a second embodiment of the image forming device according to the invention. In this image forming device, just as in Embodiment 1, when an image signal is sent from an external device such as a host computer 100 to a main controller 11 in a control unit 1, the main controller 11 analyzes the image signal, performs various image processing for it, and sends the image-processed signal to an engine controller 12. The engine controller 12 then controls the respective parts in the engine EG based on firmware stored in a flash memory 123, and forms an image corresponding to the image signal on a sheet S such as a copy paper, transfer paper, normal paper, or a transparent OHP sheet. The image forming device according to Embodiment 2 has a function that forms a full color image with a combination of toners of four colors—yellow (Y), magenta (M), cyan (C), and black (K); and a function that forms a monochrome image using only black (K) toner.

The structure, functions, and operations of the image forming device different from that in Embodiment 1 are explained below.

As shown in FIG. 8, the engine EG has: a photo conductor unit 2; a rotary developing unit 3 (a developing unit for yellow (Y developing unit) 3Y, developing unit for magenta (M developing unit) 3M, developing unit for cyan (C developing unit) 3C, and a developing unit for black (K developing unit) 3K); an intermediate transfer unit 4; a fixing unit 5; an exposure unit 8; a firmware read unit 10; and others. The structure shown in FIG. 8 is almost the same as that in Embodiment 1 shown in FIG. 1 but is different in that it includes only one firmware read unit 10 in place of the firmware read units 10A and 10B.

In Embodiment 2, developing units having small IC chips 32 attached by screws or adhesives can be used for the above-mentioned developing units.

An IC chip 32 stores a part of firmware in its semiconductor circuit. More specifically, firmware according to Embodiment 2 consists of a first portion (first firmware portion) which is not to be overwritten; and a second portion (second firmware portion) which is to be overwritten. The IC chip 32 stores the second firmware, which is one part of the firmware.

The second firmware portion stored in an IC chip 32 is read by the firmware read unit 10 and sent to the engine controller 12 upon execution of firmware overwrite processing, which will be described later. That type of IC chip 32 and firmware read unit 10 can be structured using a conventional data carrier technique.

The electrical structure of the image forming device in FIG. 8 is the same as that in Embodiment 1 (see FIG. 2A). However, in Embodiment 2, the CPU 122 runs the first firmware portion stored in the flash memory 123 and at least if it judges that the second firmware portion stored in the flash memory 123 is not normal, it executes firmware overwrite processing.

According to Embodiment 2, the image forming device is configured in such a manner that firmware overwrite processing is performed by the CPU 122, selecting either conventional firmware overwrite processing where the CPU 122 communicates with the main controller 11 via the main interface 121 and overwrites the second firmware portion stored in the flash memory 123 based on the second firmware portion sent from the main controller 11; or developing unit type firmware overwrite processing where the CPU 122 selects one of the developing units 3Y, 3M, 3C and 3K, controls the firmware read unit 10 to have it read the second firmware portion from an IC chip 32 in the selected developing unit, and overwrites the second firmware portion stored in the flash memory 123 with it.

In other words, the first firmware portion includes programs for implementing functions necessary for both the firmware overwrite processing described above, e.g., a function that judges normality of the second firmware portion stored in the flash memory 123, a function that communicates with the main controller 11, a function that controls the mechanical part 33 in the rotary development section 3; a function that controls the firmware read unit 10 to have it read the second firmware portion, and a function that overwrites the second firmware in the flash memory 123.

Example 1 of Embodiment 2

Figure 9:
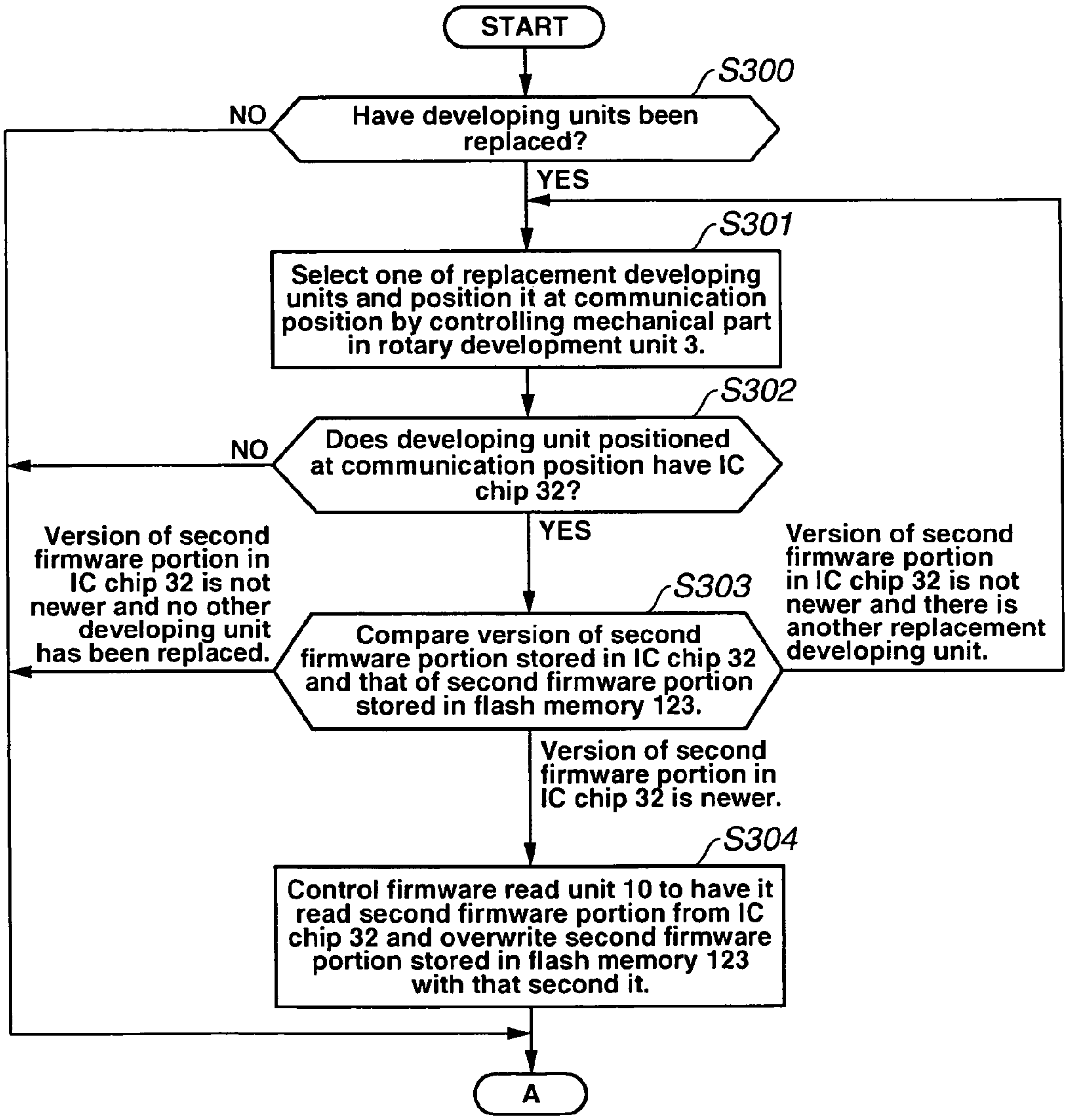
FIG. 9 is a flowchart showing developing unit type firmware overwrite processing in Example 1 of Embodiment 2.
Figure 10:
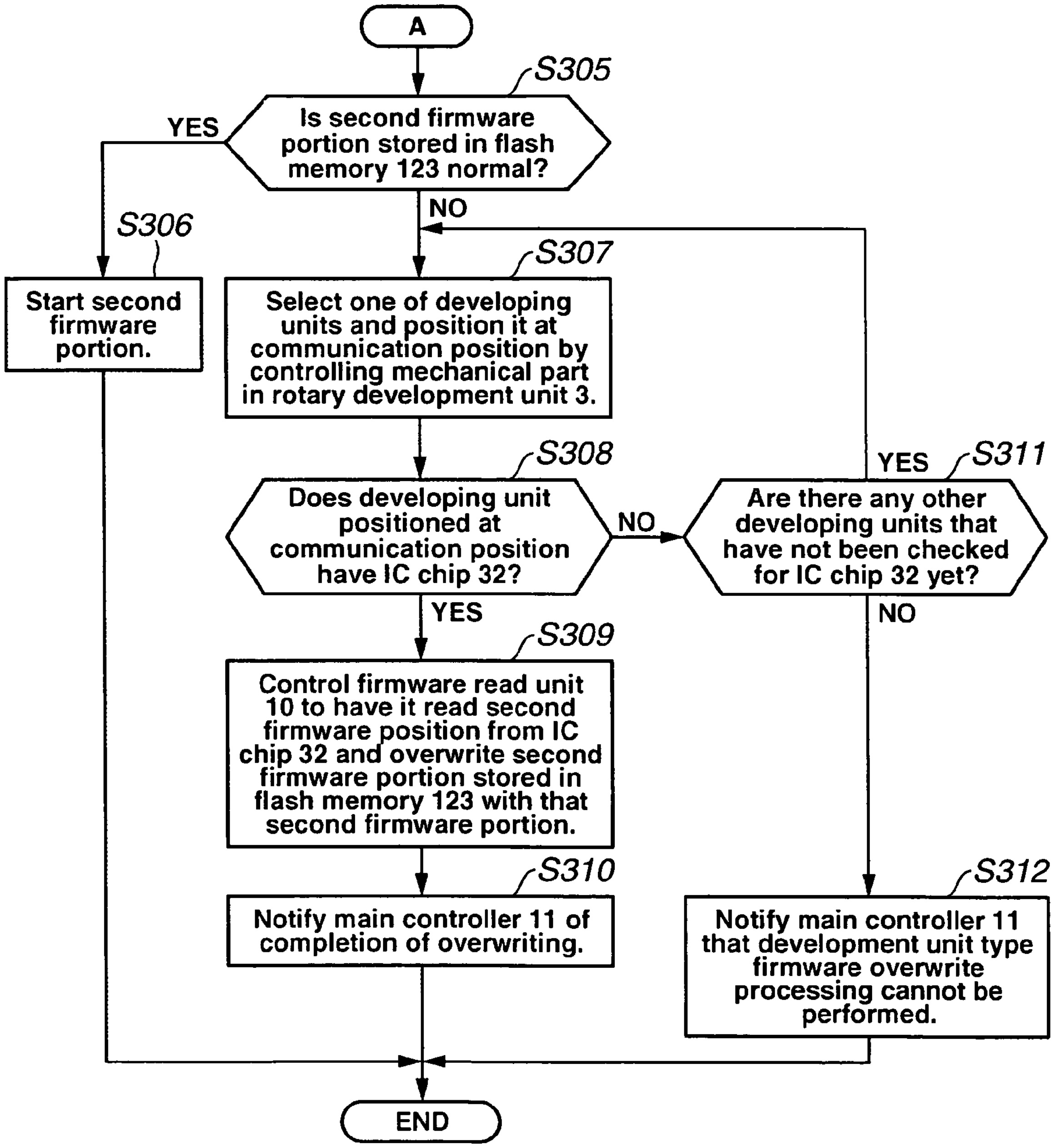
FIG. 10 is a flowchart also showing the developing unit type firmware overwrite processing in Example 1 of Embodiment 2.

A first example of the development unit type firmware overwrite processing according to Embodiment 2 is explained in detail with reference to the flowcharts shown in FIGS. 9 and 10. Note that steps in the flowcharts (including partial steps having no reference numerals attached) may be arbitrarily performed in a different order or some steps may be performed in parallel, as long as there is no inconsistency in the processing content (this can also be said for other examples).

When the image forming device is powered on, the CPU 122 runs the first firmware portion stored in the flash memory 123 (S300 to S312).

More specifically, the CPU 122 first judges whether any developing unit has been replaced during the time between power-off and power-on of the image forming device (S300). For example, it may be configured in such a manner that a flag is electrically set upon removal/installation of a developing unit so that the CPU 122 can make a judgment based on that flag.

If the CPU 122 judges that no developing unit has been replaced, it proceeds to step S305.

Whereas, if the CPU 122 judges that a developing unit has been replaced, it selects the replacement developing unit and positions it at a communication position by controlling the mechanical part 33 in the rotary development unit 3 (S301). Note that the communication position refers to a position where the firmware read unit 10 can wirelessly read a second firmware portion from an IC chip 32 in a developing unit positioned there.

The CPU 122 then further judges whether the developing unit positioned at the communication position has an IC chip 32 (S302) and if it does not have an IC chip 32, the CPU 122 proceeds to step S305.

For example, the CPU 122 judges that the developing unit does not have an IC chip 32 (including where the IC chip 32 is not functioning normally) when it controls the firmware read unit 10 to have it emit an electromagnetic wave (charge wave) to the IC chip 32 but the CPU 122 does not receive any response signal from the IC chip 32 after a predetermined number of retries.

If the CPU 122 judges that the developing unit positioned at the communication position has an IC chip 32, it controls the firmware read unit 10 to have it read the version of the second firmware portion stored in its IC chip 32 and compares it with that of the second firmware portion that has been stored in the flash memory 123 (S303).

If the version of the second firmware portion stored in the flash memory 123 is newer than or the same as that of the second firmware portion in the IC chip 32, and when there is another developing unit that has been replaced, the CPU 122 returns to step S301 to select the replacement developing unit, and if there is no such developing unit, the CPU 122 proceeds to step S305.

Whereas, if the version of the second firmware portion stored in the IC chip 32 is newer than that of the second firmware portion in the flash memory 123, the CPU 122 controls the firmware read unit 10 to have it read the second firmware portion from the IC chip 32 and overwrites the second firmware portion that has been stored in the flash memory 123 with that second firmware portion (S304). Concretely speaking, overwriting of the second firmware portion in the flash memory 123 is performed by first deleting the second firmware portion stored in the flash memory 123; reading the second firmware portion from an IC chip 32 in units of predetermined size (for example, 128 bytes); storing it in the RAM 124; and writing it in the flash memory 123.

The CPU 122 then checks the normality of the second firmware portion stored in the flash memory 123 (S305).

The normality of the second firmware portion can be checked based on header and footer information included in the second firmware portion. For example, if both the header information and the footer information have normal values, the second firmware portion is judged normal, but if either of the two has an abnormal value (including the case where the information itself does not exist), the second firmware portion is judged abnormal. For example, if there is no header information, an error may have occurred during deletion of the second firmware portion in the flash memory 123. If neither the header information nor the footer information exists, deletion of the second firmware portion from the flash memory 123 was successful but an error may have occurred by the end of overwriting. If the header information has a normal volume but footer information does not exist, a write error may have occurred during the overwrite processing.

If the CPU 122 judges that the second firmware portion stored in the flash memory 123 is normal, it starts the second firmware portion (S306). Accordingly, the processing based on the first firmware portion stored in the flash memory 123 is finished, moving to a state where normal print processing can be performed.

Whereas, if the CPU 122 judges that the second firmware portion stored in the flash memory 123 is not normal, it selects any one of the developing units (or a developing unit of a predetermined color) and positions it at the communication position by controlling the mechanical part 33 in the rotary development unit 3 (S307).

The CPU 122 then judges whether the developing unit positioned at the communication position has an IC chip 32 in the same manner as in S302 (S308).

If the CPU 122 judges that the developing unit positioned at the communication position has an IC chip 32, it controls the firmware read unit 10 to have it read the second firmware portion from the IC chip 32 and overwrites the second firmware portion that has been stored in the flash memory 123 with that second firmware portion in the same manner as in step S304 (S309).

When the overwriting of the second firmware portion is complete, the CPU 122 notifies the main controller 11 of the completion of the overwriting (S310). In this case, the main controller 11 indicates a reset-requesting message on the display 132 and moves to a reset waiting mode. Note that the CPU 122 may return to S305 after the overwriting of the second firmware portion is completed.

Whereas, if the CPU 122 judges that the developing unit positioned at the communication position does not have an IC chip 32, it judges if there are any other developing units it has not checked for IC chips 32 (S311). For example, it may be configured in such a manner that the CPU 122 counts the number of judgments it makes regarding whether replacement developing units have IC chips 32 and when the number of judgments reaches the number of the developing units set in the image forming device (4 in this embodiment), the CPU 122 judges that there are no developing units left to check.

If the CPU 122 judges that there is a developing unit it has not checked yet for an IC chip 32, it returns to step S307 to select that developing unit.

Meanwhile, if the CPU 122 judges that there is no developing unit left to check, it notifies the main controller 11 that it cannot perform the development unit type firmware overwrite processing (S312). In this case, the main controller 11 displays a message or similar requesting execution of the conventional firmware overwrite processing on the display 132 and moves to a standby mode to wait for commands, etc.

According to the above-described processing, the CPU 122 checks the normality of the second firmware portion after the start-up of the image forming device and when it judges that the second firmware portion is not normal, whether or not to read the second firmware portion from an IC chip 32 in a developing unit and overwrite the second firmware portion that has been stored in the flash memory 123 with that second firmware portion is determined. Accordingly, even if a write error occurs in the second firmware portion in the flash memory 123 during the firmware overwrite processing, it is possible to read the second firmware portion from the IC chip 32 in the developing unit stably without fail and overwrite the firmware with that second firmware portion by restarting the image forming device.

Moreover, because the firmware consists of different parts—a first firmware portion which is not to be overwritten and a second firmware portion which is to be overwritten—and processing (e.g., developing unit positioning processing and read processing) required when reading the second firmware portion from an IC chip 32 in a developing unit is performed based on the not-to-be-overwritten first firmware portion, even if a write error occurs in the flash memory 123 during the firmware overwrite processing, it is possible to read the second firmware portion from the IC chip 32 in the developing unit stably without fail and overwrite the firmware based on the first firmware portion, which is not to be overwritten (i.e., a write error does not occur in the first firmware portion).

Example 2 of Embodiment 2

In Example 1 of Embodiment 2, the image forming device is configured in such a manner that, when the CPU 122 judges that the second firmware portion stored in the flash memory 123 is not normal, it selects developing units one by one to check whether it can read the second firmware portion from them and reads the second firmware portion beginning with the first developing unit the CPU 122 judged readable-from. However, in Example 2, the image forming device is configured in such a manner that, when the CPU 122 judges that the second firmware portion stored in the flash memory 123 is not normal, it checks whether it can read the second firmware portion from the respective developing units, and reads the latest version of the second firmware portion from among the second firmware portions of the developing units.

Figure 11:
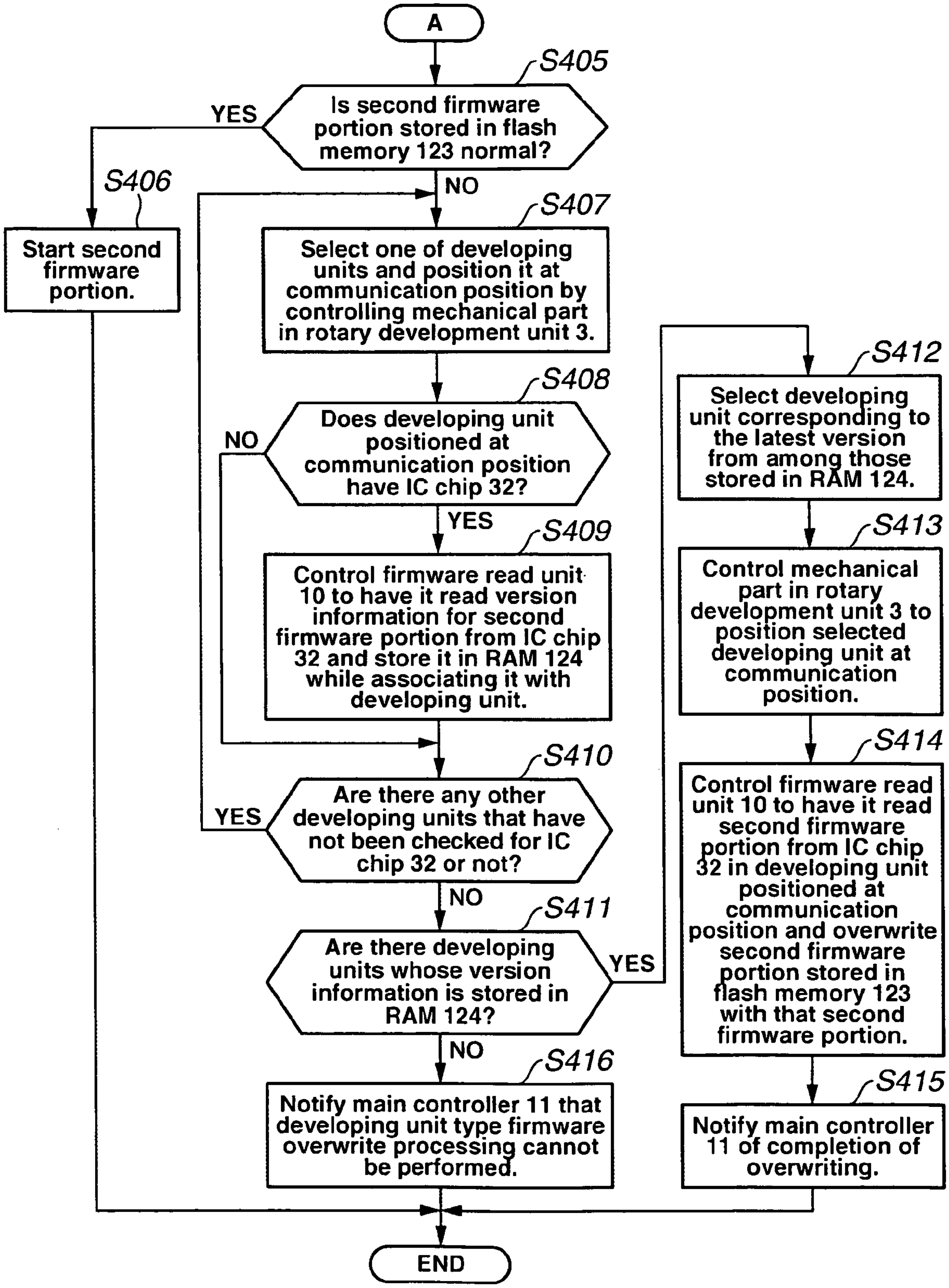
FIG. 11 is a flowchart also showing the developing unit type firmware overwrite processing in Example 2 of Embodiment 2.

The developing unit type firmware overwrite processing in Example 2 will be explained in detail with reference to the flowchart shown in FIG. 11.

When the image forming device is powered on, the CPU 122 runs the first firmware portion stored in the flash memory 123 (S400 to S416).

Figure 3:
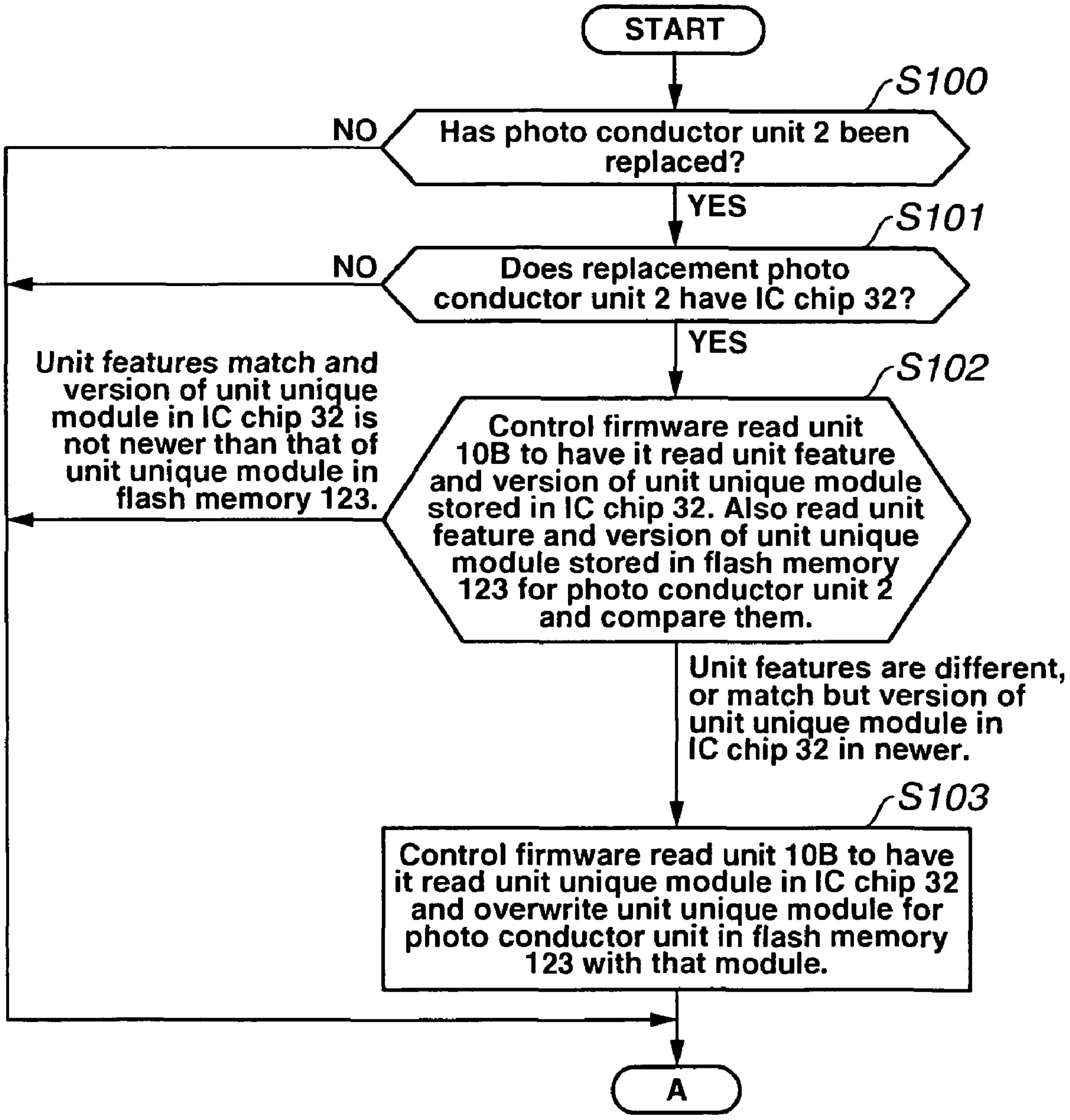
FIG. 3 is a flowchart showing unit-based firmware overwrite processing in Example 1 of Embodiment 1.
Figure 4:
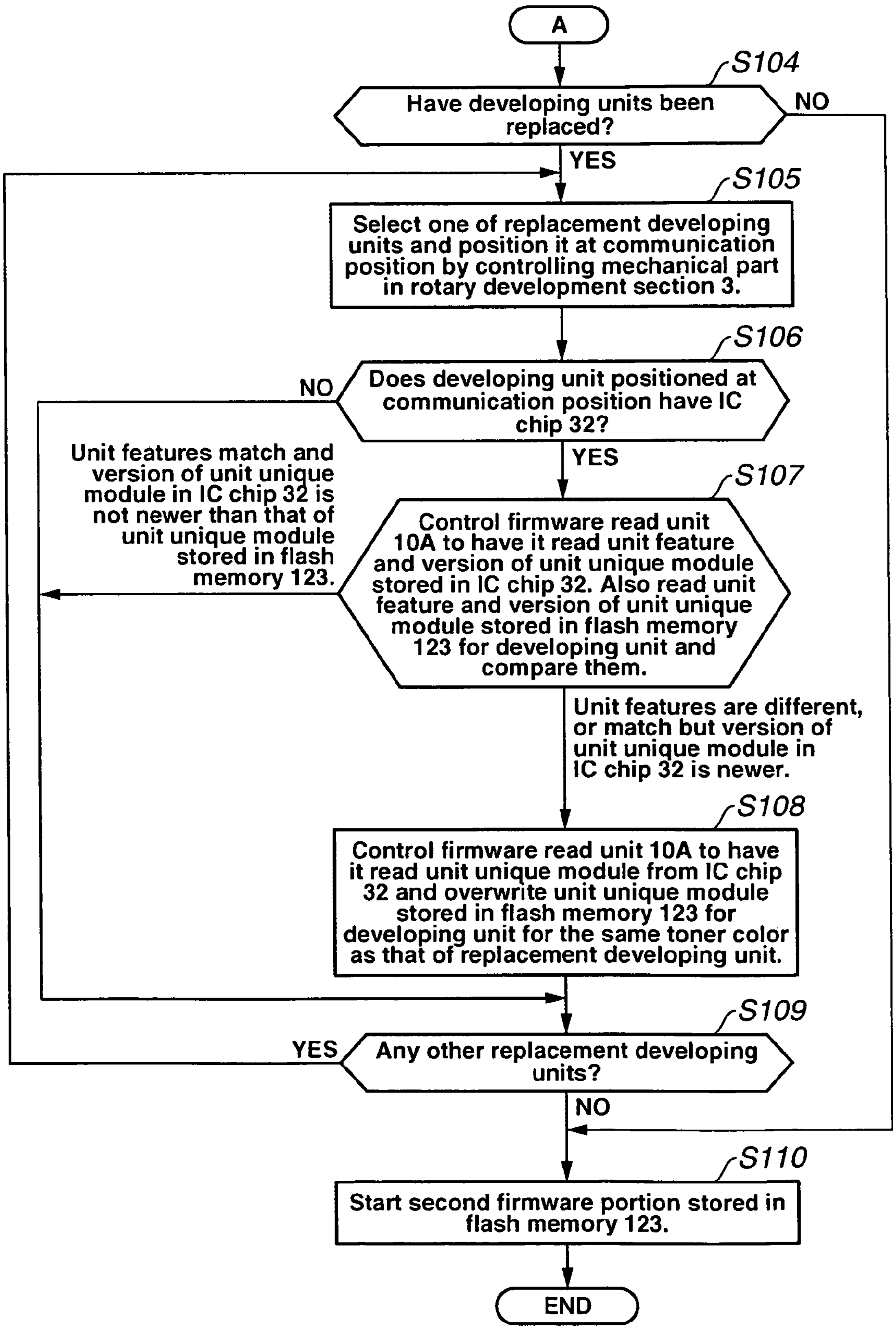
FIG. 4 is a flowchart also showing the unit-based firmware overwrite processing in Example 1 of Embodiment 1.

The content of steps S400 to S408 is the same as that of steps S300 to S308 (see FIG. 3).

If the CPU 122 judges that the developing unit positioned at the communication position has an IC chip 32, it controls the firmware read unit 10 to have it read the version information for the second firmware portion from the IC chip 32 and stores it in the RAM 124 while associating it with the developing unit (S409).

Whereas, when the CPU 122 judges that the developing unit does not have an IC chip 32, or after it executes step S409, it judges whether there are any other developing units it has not checked for IC chips 32 (S410). The judgment can be made in the same manner as in Example 1 of Embodiment 2.

If the CPU 122 judges that there is a developing unit it has not checked for an IC chip 32, it returns to step S407 to check whether that developing unit has an IC chip 32.

Whereas, if the CPU 122 judges that there is no developing unit left to check, it refers to the RAM 124 to judge whether version information for developing unit(s) is stored therein (S411).

If the CPU 122 judges that version information for developing unit(s) is stored in the RAM 124, it selects the developing unit corresponding to the latest version (S412). Note that, if there is only one developing unit that stores version information, the CPU 122 selects that developing unit.

The CPU 122 then controls the mechanical part 33 in the rotary development unit 3 to position the selected developing unit at the communication position (S413).

The CPU 122 then controls the firmware read unit 10 to have it read the second firmware portion from the IC chip 32 in the developing unit at the communication position and overwrites the second firmware portion stored in the flash memory 123 with that second firmware portion (S414). Overwriting can be performed in the same manner as in Example 1.

When the CPU 122 completes overwriting the second firmware portion, it notifies the main controller 11 of the completion (S415). In this case, the main controller 11 displays a reset-requesting massage on the display 132 and moves to a reset-waiting mode. Note that the CPU 122 may alternatively return to S405 when the overwriting of the second firmware portion is complete.

Meanwhile, if the CPU 122 judges that no version information for developing unit(s) is stored in the RAM 124, it notifies the main controller 11 that it cannot perform developing unit type firmware overwrite processing (S416).

According to the above-described processing, in addition to the effects in Example 1, when the CPU 122 judges that the second firmware portion stored in the flash memory 123 is not normal, the firmware overwrite processing is performed by reading the second firmware portion of the latest version from among the second firmware portions stored in the IC chips 32 in the respective developing units.

Example 3 According to Embodiment 2

In Example 3, the image forming device is configured in such a manner that, upon reading the second firmware portion from an IC chip 32 and overwriting the second firmware portion in the flash memory 123 with that second firmware portion, the CPU 122 memorizes from which IC chip 32 the second firmware portion has been read so that when it is judged that a write error has occurred and the firmware overwrite processing is to be performed, the CPU 122 selects the memorized developing unit and reads the second firmware portion from it.

Figure 12:
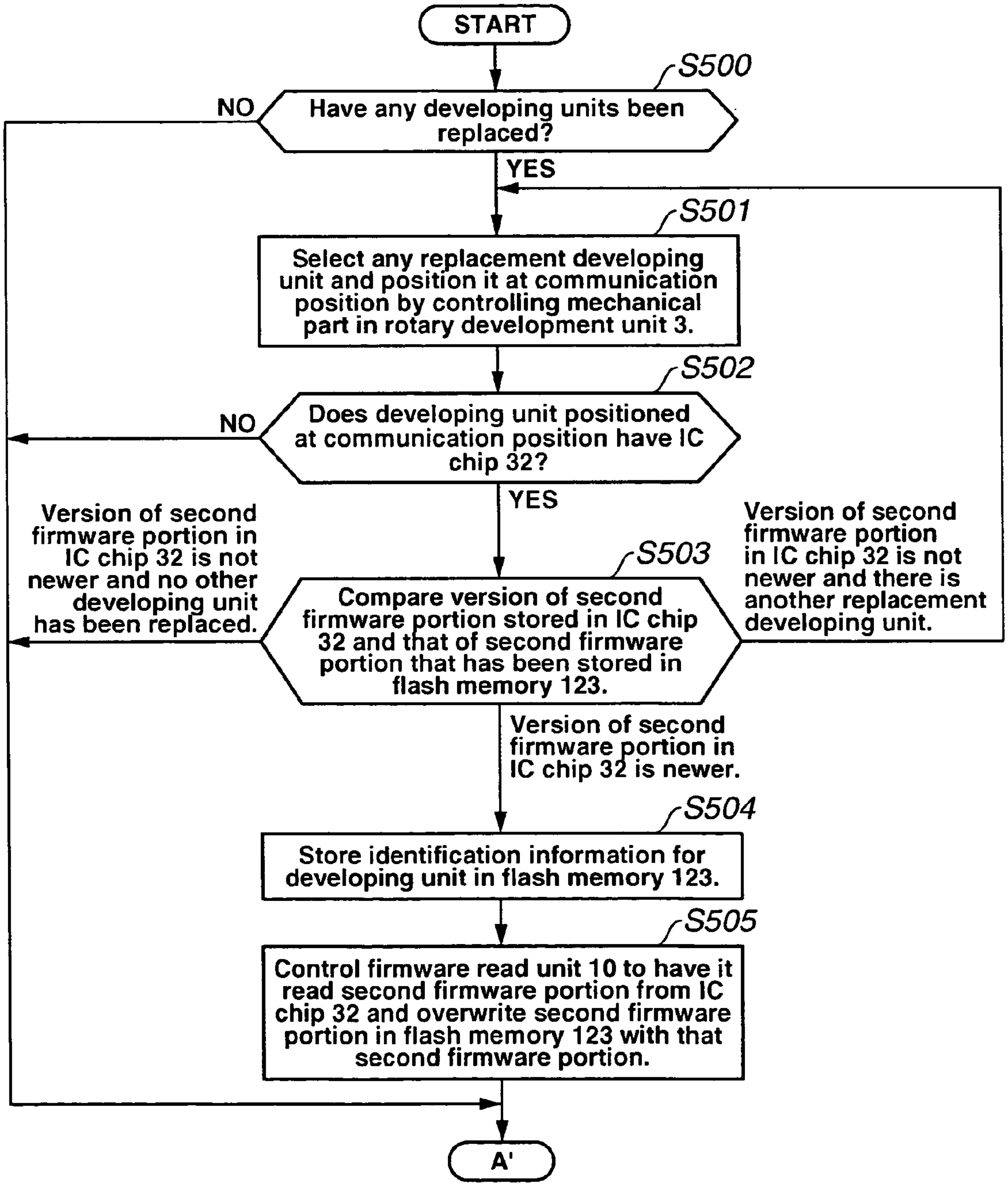
FIG. 12 is a flowchart showing developing unit type firmware overwrite processing in Example 3 of Embodiment 2.
Figure 13:
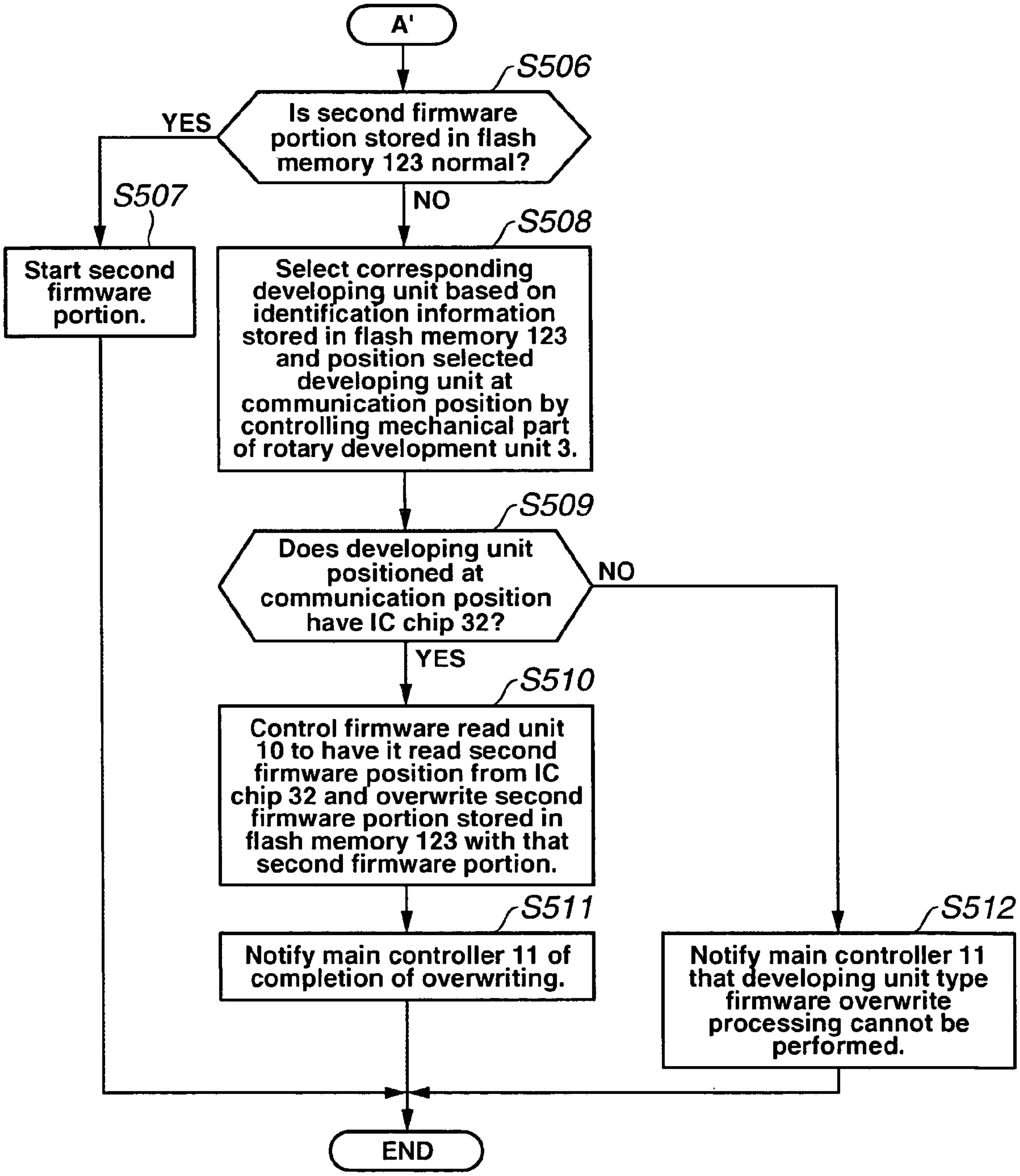
FIG. 13 is a flowchart showing the developing unit type firmware overwrite processing in Example 3 of Embodiment 2.

A third example of the developing unit type firmware overwrite processing is explained below in detail with reference to the flowcharts shown in FIGS. 12 and 13.

When the image forming device is powered on, the CPU 122 runs the first firmware portion stored in the flash memory 123 (S500 to S512).

The content of steps S500 to S503 is the same as that of steps S300 to S303 in Example 1.

When the CPU 122 judges that the version of the second firmware portion stored in an IC chip 32 of a developing unit is newer than that of the second firmware portion in the flash memory 123, it stores identification information for the developing unit (e.g., unit number and color information) in the flash memory 123 (S504).

The CPU 122 then controls the firmware read unit 10 to have it read the second firmware portion from the IC chip 32 and overwrites the second firmware portion in the flash memory 123 with that second firmware portion (S505).

The content of steps S506 and S507 is the same as that of steps S305 and S306.

When the CPU 122 then judges that the second firmware portion stored in the flash memory 123 is not normal, it selects the corresponding developing unit based on the identification information stored in the flash memory 123 and positions the selected developing unit at the communication position by controlling the mechanical part 33 of the rotary development unit 3 (S508).

The content of steps S509 to S511 is the same as that of steps S308 and S310 in Example 1.

If the CPU 122 judges that the developing unit positioned at the communication position in S509 does not include an IC chip 32, it notifies the main controller 11 that it cannot perform the developing unit type firmware overwrite processing (S512). In this case, the main controller 11 displays a message requesting conventional firmware overwrite processing on the display 132 and moves to a standby mode to wait for commands, etc.

According to the above-described processing, in addition to the effects in Example 1, when the CPU 122 judges that the second firmware portion stored in the flash memory 123 is not normal, the CPU 122 can select the developing unit that has been selected in the previous firmware overwrite processing, accordingly, the second firmware portion can be overwritten with the same content (the same version of the second firmware portion) as used in the previous firmware overwrite processing.

Modified Example According to Embodiment 2

The invention is not limited to Embodiment 2 but can be modified in various forms. For example, IC chips 32 storing second firmware portions may alternatively be provided in removable consumable units other than developing units (e.g., units 2, 4, 5, and 8, which can also be considered as consumable products because they deteriorate with age), so that the second firmware portions can be read therefrom.

In Embodiment 2, the invention is applied to a 4-cycle type image forming device which develops a toner image for each color, but the invention is not limited to that embodiment. For example, the invention can also be applied to a tandem type image forming device, which develops toner images of all colors at a time. However, in that case, it is necessary to provide firmware read units for developing units for each color respectively or to provide a mechanical part for driving a firmware read unit to a position where it can communicate with the respective developing units. Furthermore, the invention may also be applied to image forming devices other than a laser printer, i.e., it may also be applied to various types of image forming devices including inkjet type image forming devices, copy machines, facsimiles, and image forming devices called dumb printers, or host-based printers that have limited firmware functions.

Moreover, in Embodiment 2, overwriting of the second firmware portion is performed in such a manner that, if a developing unit, which the CPU 122 judges as having been installed in the device in place of a previous developing unit, has an IC chip 32 and the version of the second firmware portion in that IC chip 32 is newer than that of the second firmware portion in the flash memory 123, the second firmware portion is read from the IC chip 32 to overwrite the second firmware portion in the flash memory 123 with that second firmware portion. However the invention is not limited to that case and it may also be configured in such a manner that, if there are one or more developing units, which the CPU 122 judges as having been installed in place of previous developing units, that have IC chips 32, the versions of the second firmware portions in those IC chips 32 are compared and the latest version of the second firmware portion is read.

Furthermore, in Embodiment 2, the normality of firmware is judged based on header information and footer information for the firmware. The invention however is not limited to this configuration. Normality of firmware can alternatively be judged in such a manner that, when a communication error, deletion error, or a write error occurs, an overwrite error flag is set for a part of the memory so that the normality can be judged based on the flag. It is also possible to check the normality of the firmware using a Cyclic Redundancy Check or check sum.

Also, in Example 3 of Embodiment 2, when the second firmware portion stored in the flash memory 123 is judged abnormal in step S508, the corresponding developing unit is selected based on the identification information stored in the flash memory 123. However, the invention is not limited to that configuration. It is also possible to have, when performing firmware overwrite processing, the flash memory 123 store information indicating whether the firmware overwrite processing is the conventional type firmware overwrite processing or the developing unit type firmware overwrite processing so that, in step S508, if previous firmware overwrite processing is conventional type firmware overwrite processing, a corresponding developing unit is not selected but a notice requesting the conventional type firmware overwrite processing is transmitted to the main controller 11. Moreover, considering the possibility of an overwrite error occurring due to damage in the second firmware portion in the IC chip 32 in a previously-selected developing unit, it is also possible to preferentially select a developing unit other than the developing unit corresponding to the identification information stored in the flash memory 123 in step S308.

What is claimed is:

1. An image forming device comprising:

rewritable memory that stores firmware composed of a first firmware portion which is not to be overwritten and a second firmware portion which is to be overwritten; and a controller that performs print processing based on the second firmware portion stored in the memory, wherein, the image forming device is structured including a plurality of detachable, consumable units, each having a storage unit that stores a second firmware portion; and when it is judged that the second firmware portion stored in the memory is not normal, the controller selects, from among the consumable units set in the image forming device, the consumable unit having the storage unit storing the latest version of the second firmware portion and reads the second firmware portion from the storage unit in the consumable unit and overwrites the second firmware portion in the memory with that second firmware portion, based on the first firmware portion stored in the memory.

2. The image forming device according to claim 1, wherein the controller positions the consumable unit at a specified position by controlling a mechanical part for moving the consumable unit in order to read, wirelessly, the second firmware portion from the storage unit in the consumable unit.

3. An image forming device comprising:

rewritable memory that stores firmware composed of a first firmware portion which is not to be overwritten and a second firmware portion which is to be overwritten; and a controller that performs print processing based on the second firmware portion stored in the memory, wherein the image forming device is structured including a plurality of detachable, consumable units, each having a storage unit that stores a second firmware portion; and when it is judged that the second firmware portion in the memory is not normal, the controller selects, from among the consumable units set in the image forming device, the consumable unit selected in a previous overwriting and reads the second firmware portion from the storage unit in that selected consumable unit and overwrites the second firmware portion in the memory with that second firmware portion, based on the first firmware portion stored in the memory.

4. The image forming device according to claim 3, wherein the controller positions the consumable unit at a specified position by controlling a mechanical part for moving the consumable unit in order to read, wirelessly, the second firmware portion from the storage unit in the consumable unit.

* * * * *